US012308513B2

(12) United States Patent
Moon et al.

(10) Patent No.: US 12,308,513 B2
(45) Date of Patent: May 20, 2025

(54) ANTENNA DEVICE

(71) Applicants: NISSHA CO., LTD., Kyoto (JP); INU RESEARCH & BUSINESS FOUNDATION, Incheon (KR)

(72) Inventors: In Yeol Moon, Gyeonggi-do (KR); Ryomei Omote, Kyoto (JP); Yoshihiro Sakata, Kyoto (JP); Toshifumi Kurosaki, Kyoto (JP); Shohei Morimoto, Kyoto (JP); Sungtek Kahng, Seoul (KR); Changhyeong Lee, Gyeongsangbuk-do (KR); Yejune Seo, Incheon (KR)

(73) Assignees: NISSHA CO., LTD., Kyoto (JP); INU RESEARCH & BUSINESS FOUNDATION, Incheon (KR)

( * ) Notice: Subject to any disclaimer, the term of this patent is extended or adjusted under 35 U.S.C. 154(b) by 457 days.

(21) Appl. No.: 17/910,155

(22) PCT Filed: Feb. 24, 2021

(86) PCT No.: PCT/JP2021/006929
§ 371 (c)(1),
(2) Date: Sep. 8, 2022

(87) PCT Pub. No.: WO2021/182106
PCT Pub. Date: Sep. 16, 2021

(65) Prior Publication Data

US 2023/0130575 A1 Apr. 27, 2023

(30) Foreign Application Priority Data

Mar. 13, 2020 (JP) ................................ 2020-044691

(51) Int. Cl.
*H01Q 1/27* (2006.01)
*H01Q 1/40* (2006.01)
*H01Q 15/00* (2006.01)

(52) U.S. Cl.
CPC ............... *H01Q 1/273* (2013.01); *H01Q 1/40* (2013.01); *H01Q 15/008* (2013.01)

(58) Field of Classification Search
CPC ............ H01Q 1/273; H01Q 1/38; H01Q 1/40; H01Q 15/008; H01Q 15/0093; H01Q 15/006
See application file for complete search history.

(56) References Cited

U.S. PATENT DOCUMENTS 6,800,936 B2 * 10/2004 Kosemura .............. H01L 23/66 361/761
2007/0075903 A1 * 4/2007 Matsugatani ........ H01Q 15/008 343/909

(Continued)

OTHER PUBLICATIONS

Extended European Search Report in corresponding EP 21767282.3 dated Jul. 21, 2023 (pp. 1-10).

(Continued)

*Primary Examiner* — Awat M Salih
(74) *Attorney, Agent, or Firm* — Millen, White, Zelano & Branigan; William F. Nixon

(57) ABSTRACT

An antenna device suppresses reflection of electromagnetic waves from a human body or other conductors, which causes the electromagnetic waves to be sufficiently emitted in a target direction. The antenna device includes an antenna pattern and a metasurface layer. The metasurface layer is a layer that is layered on the antenna pattern and disposed on the human body side. The metasurface layer includes a first low-loss film and a second low-loss film. A first metasurface is formed on the first low-loss film. A second metasurface is formed on the second low-loss firm.

20 Claims, 29 Drawing Sheets

(56) References Cited

U.S. PATENT DOCUMENTS

| | | | | |
|---|---|---|---|---|
| 2007/0267942 | A1* | 11/2007 | Matsumoto | H03H 9/178 310/366 |
| 2008/0129511 | A1 | 6/2008 | Yuen et al. | |
| 2016/0174842 | A1* | 6/2016 | Hyde | H01Q 21/30 342/52 |
| 2019/0131719 | A1* | 5/2019 | Haziza | H01Q 3/36 |
| 2019/0196267 | A1* | 6/2019 | Yoo | B29D 11/00326 |
| 2020/0315001 | A1* | 10/2020 | Khan | H01Q 1/38 |
| 2024/0072415 | A1* | 2/2024 | Peng | H01Q 21/24 |

OTHER PUBLICATIONS

Sakthi Abirami Balakrishnan et al: "Conformal self-balanced EBG integrated printed folded dipole antenna for wireless pody area networks" IET Micorwaves, Antennas and Propagation; vol. 13, Issue14, Nov. 2019, pp. 2480-2485 https://doi.org/10.1049/iet-map.2019.0029.

Agarwal Kush et al: "Wearable AMC Backed Near-Endfire Antenna for On-Body Communications on Latex Substrate", Feb. 2016IEEE Transactions on Components, Packaging, and Manufacturing Technology 6(3):1-13 DOI:10.1109/TCPMT.2016.2521487.

Iqbal Amjad, Basir Abdul, Smida Amor, Mallat Nazih Khaddaj, Elfergani Issa, Rodriguez Jonathan, Kim Sunghwan: "Electromagnetic bandgap backed MM-wave MIMO antenna for wearable applications", IEEE Access, vol. 7, 2019, pp. 111135-111144, XP011741595.

Lin, X. Y. et al.: "Flexible fractal electromagnetic bandgap for millimeter-wave wearable antennas", IEEE Antennas and Wireless Propagation Letters, vol. 17, No. 7, 2018, pp. 1281-1285, XP011686635, DOI: 10.1109/LAWP.2018.2842109.

Wang Mengjun, Yang Ze, Wu Jianfei, Bao Jianhui, Liu Jianying, Cai Lulu, Dang Tao, Zheng Hongxing, Li Erping: "Investigation of SAR reduction using flexible antenna with metamaterial structure in wireless body area network", IEEE Transactions On Antennas and Propagation, vol. 66, No. 6, 2018, pp. 3076-3086, XP055856761.

International Search report PCT/JP2021/006929 dated Mar. 13, 2020 (pp. 1-8) and English translation (pp. 1-3).

* cited by examiner

ANTENNA DEVICE

TECHNICAL FIELD

The present invention relates to an antenna device and particularly to an antenna device to be used at or near a human body or other conductors.

BACKGROUND ART

In recent years, various types such as watch type, spectacle type, ring type, shoe type, pocket type, and pendant type of wearable computers have been developed.

Electronic devices such as earphones and headphones to be used in close contact with a human body have also been already used. Furthermore, electronic devices such as mobile phones and smart phones are obviously used in close contact with or close to a human body.

Various types of antennas for performing communication are incorporated in the electronic devices described above (for example, see Patent Document 1).

CITATION LIST

Patent Literature

Patent Document 1: JP 2018-170679 A

SUMMARY OF INVENTION

Technical Problem

The inventors of the present application have focused on the fact that using a known electronic device with an antenna in close contact with or at or near a human body (head or hand) causes the following problem.

The problem is that radio waves emitted from the antenna are reflected on the human body, and thus emission characteristics of the antenna are distorted. In this case, the radio waves are not sufficiently emitted from the antenna in the target direction.

An object of the present invention is to suppress reflection from a human body or other conductors in an antenna device and thereby allow radio waves to be sufficiently emitted in the target direction.

Solution to Problem

Some aspects will be described below as means to solve the problems. These aspects can be combined randomly as necessary.

An antenna device according to an aspect of the present invention configured to be used in contact with or close to a human body or a conductor includes an antenna and a metasurface layer.

The metasurface layer is a layer that is layered on the antenna and disposed on a human body side. The metasurface layer includes a low-loss film and a metasurface formed on the low-loss film.

In the device, the metasurface layer is disposed on the human body side of the antenna. Accordingly, the metasurface layer suppresses reflection of electromagnetic waves from the human body side, allowing the influence on the antenna to be reduced. As a result, radio waves are sufficiently emitted in the target direction.

In the device, the metasurface is disposed on the low-loss film. In this case, using the thin low-loss film allows the small antenna device to be implemented.

A plurality of the low-loss films may be used.

The metasurface may be formed on each of the plurality of the low-loss films.

The device forms the metasurfaces on the low-loss films in a multi-layer, allowing even the thin low-loss film to configure a filter equivalent circuit that suppresses multiple reflection with a multi-stage circuit configuration. This enables impedance matching.

The low-loss film may have a thickness of 150 μm or less.

The metasurface may have a fractal shape.

In the device, increasing the fractal order of the metasurface allows broadband characteristics to be easily achieved.

Advantageous Effects of Invention

An antenna device according to the present invention suppresses reflection from the human body, allowing radio waves to be sufficiently emitted in the target direction.

DESCRIPTION OF EMBODIMENTS

1. First Embodiment (1) Basic Configuration

Figure 1:
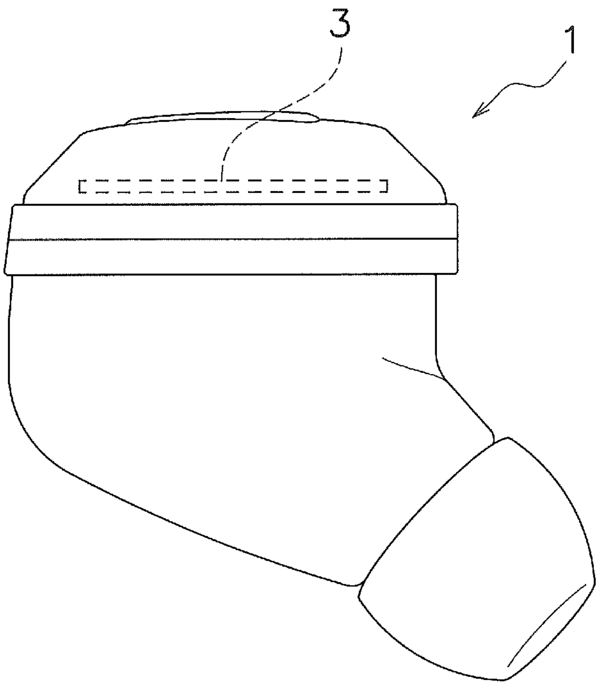
FIG. 1 is a schematic perspective view of a wireless earbud in which an antenna device according to a first embodiment of the present invention is incorporated.

A wireless earbud 1 will be described with the use of FIG. 1. FIG. 1 is a schematic perspective view of the wireless earbud in which an antenna device according to a first embodiment of the present invention is incorporated.

The wireless earbud 1 includes an antenna device 3 and the like that are incorporated in a housing.

Figure 2:
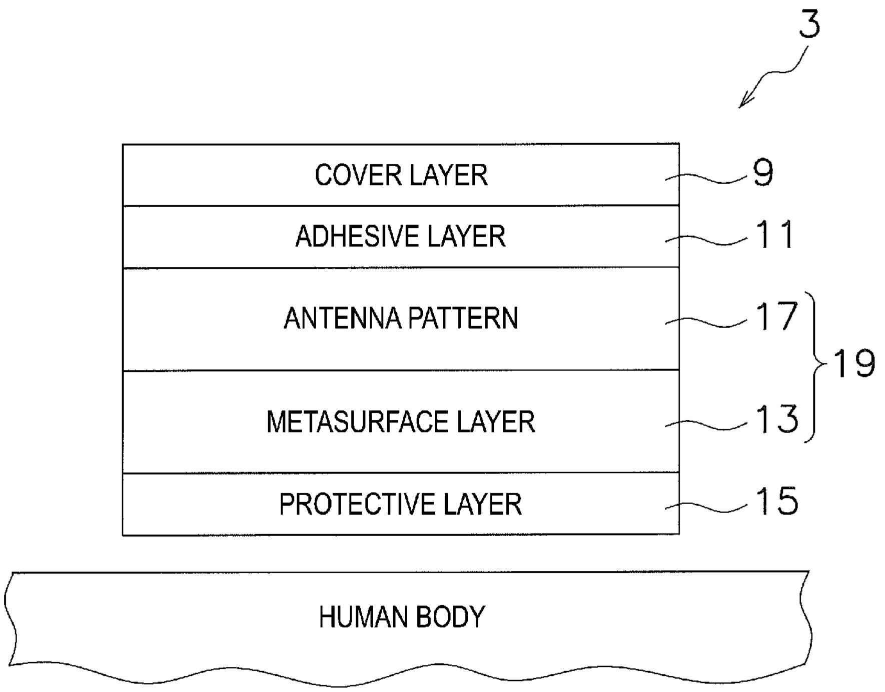
FIG. 2 is a schematic diagram illustrating a layer configuration of the antenna device.

The antenna device 3 will be described with the use of FIG. 2. FIG. 2 is a schematic diagram illustrating a layer configuration of the antenna device.

In FIG. 2, a lower side in the drawing is a human body side. The antenna device 3 is, for example, Bluetooth (trade name), and includes a cover layer 9, an adhesive layer 11, a metasurface layer 13 (an example of a metasurface layer), and a protective layer 15 from an upper side to the lower side in the drawing.

The metasurface layer 13 includes one or more low-loss films and metasurfaces (described below). An antenna pattern 17 (an example of an antenna) is formed on an upper surface of the metasurface layer 13 in the drawing. The metasurface layer 13 is disposed on the human body side with respect to the antenna pattern 17. An antenna film 19 is formed of the metasurface layer 13 and the antenna pattern 17 that are described above.

The cover layer 9 is made of, for example, polycarbonate, and has a thickness of 2 mm. The adhesive layer 11 is, for example, OCA, and has a thickness of 25 μm. The antenna pattern 17 is made of, for example, copper, and has a thickness of 3 μm.

(2) Detailed Description of Antenna Film

Figure 3:
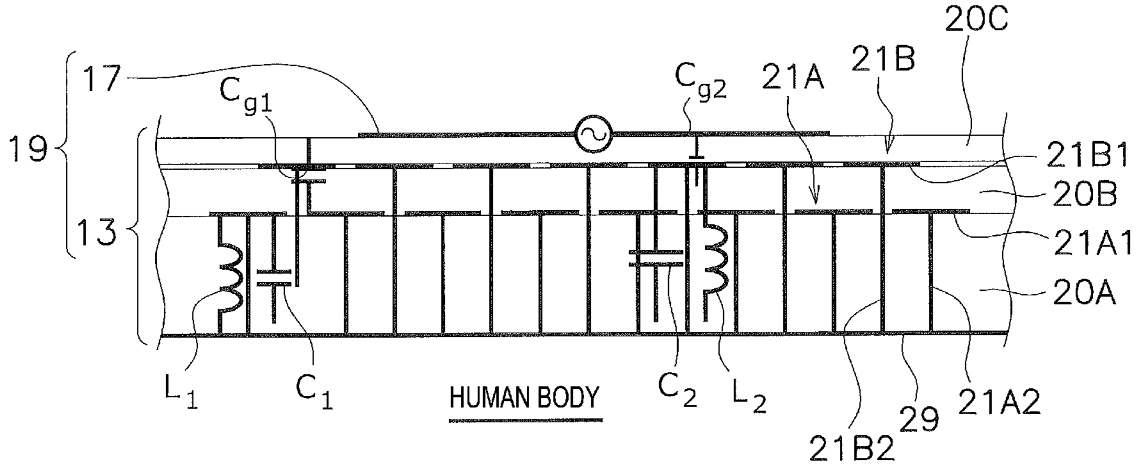
FIG. 3 is a schematic diagram illustrating a cross-sectional configuration of an antenna film.

The antenna film 19 will be described with the use of FIG. 3. FIG. 3 is a schematic diagram illustrating a cross-sectional configuration of the antenna film.

The antenna film 19 includes a first low-loss film 20A, a second low-loss film 20B, and a third low-loss film 20C from the lower side in the drawing. The films are layered one another. Each of the low-loss films is made of, for example, PET or COP, and has a thickness of 50 to 150 μm. The low-loss film may be made of any material having a low tan δ (low-dielectric loss material) and is not limited to particular materials. The total thickness of the low-loss film is preferably 150 μm or less.

The antenna pattern 17 is formed on an upper surface of the third low-loss film 20C.

A first electrode 21A1 of a first metasurface 21A is formed on an upper surface of the first low-loss film 20A. A second electrode 21B1 of a second metasurface 21B is formed on an upper surface of the second low-loss film 20B. The metasurface is made of, for example, copper, and has a thickness of 3 μm. Also, the metasurface may be formed of a visible light transparent conductive film. Specifically, Indium Tin Oxide (ITO) and transparent conductive ink (for example, silver nanowire ink) are used.

Note that the metasurface is "a periodic structure shorter than an artificially constructed incident radio wavelength". Electromagnetic field characteristics are determined by a resonance phenomenon of the periodic structure in the metasurface, and appropriately designing the periodic structure allows peculiar electromagnetic field characteristics having a negative refractive index, which cannot be obtained from the natural world, to be obtained.

A ground 29 is formed on a lower surface of the first low-loss film 20A. The ground 29 is a fully formed solid layer.

The first electrodes 21A1 are disposed at intervals from each other, for example, in a grid. Capacitance components are generated between the intervals. Further, capacitance components are also generated between the first electrodes 21A1 and the ground 29. Furthermore, inductance components are generated in the first electrode 21A1 itself.

The same applies to the second electrode 21B1.

The first metasurface 21A includes a first through-hole 21A2 through which the first electrode 21A1 is connected to the ground 29.

The second metasurface 21B includes a second through-hole 21B2 through which the second electrode 21B1 is connected to the ground 29.

The first through-hole 21A2 corresponds to each one of the first electrodes 21A1 and extends through the second low-loss film 20B and the first low-loss film 20A to connect the first electrode 21A1 to the ground 29. Therefore, an inductance component is generated in the first through-hole 21A2.

The same applies to the second through-hole 21B2.

Figure 4:
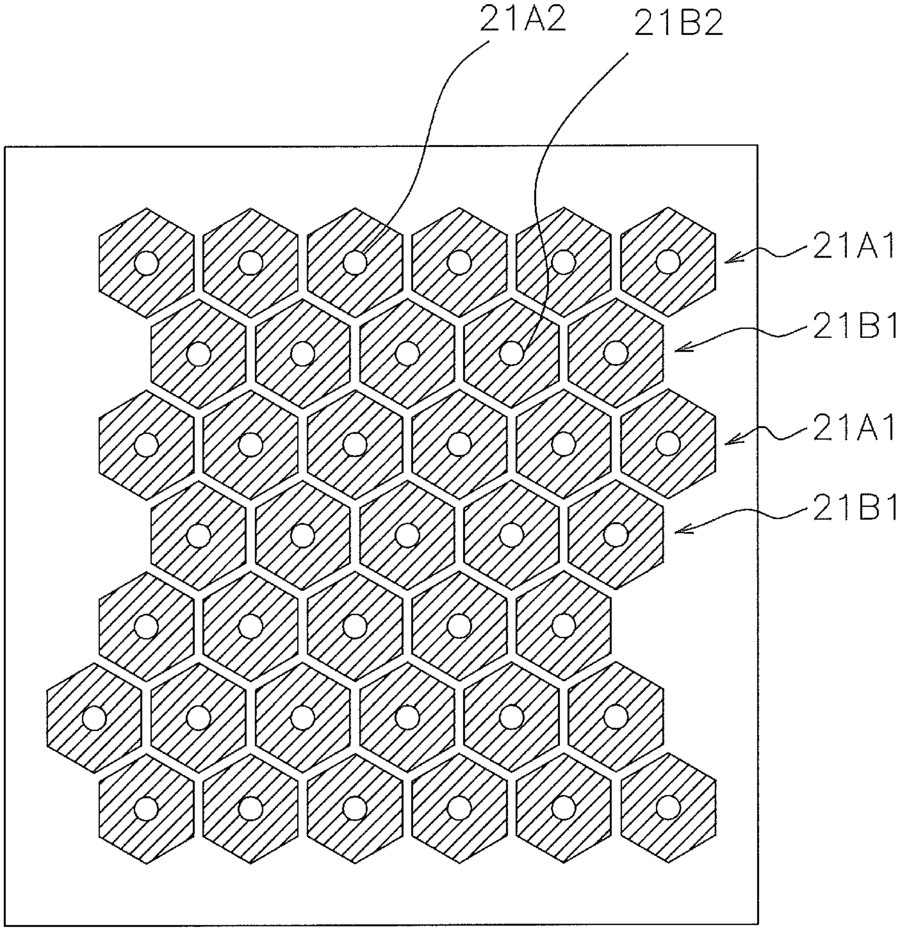
FIG. 4 is a schematic plan view illustrating a plane position of a metasurface.

The pattern arrangement of the first metasurface and the second metasurface will be described with the use of FIG. 4. FIG. 4 is a schematic plan view illustrating a plane position of a metasurface.

The first electrode 21A1 and the second electrode 21B1 are regular hexagons. The first electrodes 21A1 and the second electrodes 21B1 in respective rows are alternately arranged side by side and are not overlapped with each other in a planar view. Note that the first through-hole 21A2 is provided corresponding to the first electrode 21A1 and that the second through-hole 21B2 is provided corresponding to the second electrode 21B1. In addition, the shape and arrangement position of the electrode is not limited. For example, the electrodes may be partially overlapped with each other.

The structure described above allows an electromagnetic band gap (EBG) or artificial magnetic conductor (AMC) structure to be implemented.

Adopting the EBG structure as described above allows the thickness of the antenna (for example, the thickness of the antenna film 19) of λ/4 or less while maintaining emission efficiency. This is because the periodic structure is well formed in accordance with the target frequency and thus electromagnetic waves incident on the EBG structure can be in phase with reflected electromagnetic waves. In a case where the phase is the same, electromagnetic waves reflected from the EBG structure and electromagnetic waves emitted into the space without being reflected intensify together even when the thickness is not set to λ/4. Therefore, the thickness can be reduced with emission efficiency maintained.

As described above, the first metasurface 21A and the second metasurface 21B are respectively disposed on the first low-loss film 20A and the second low-loss film 20B. In this case, using thin low-loss films enables the small antenna device to be established.

Figure 5:
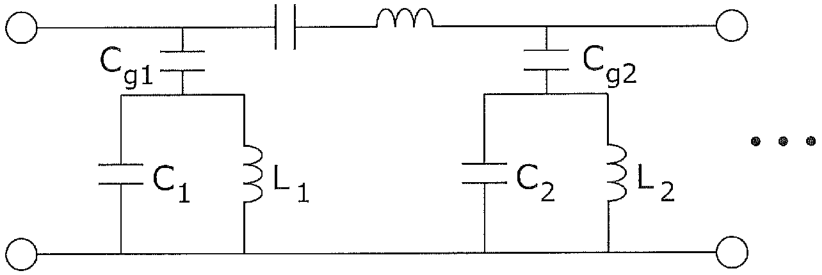
FIG. 5 is an equivalent circuit diagram of the antenna device.

An equivalent circuit of the antenna device will be described with the use of FIG. 5. FIG. 5 is an equivalent circuit diagram of the antenna device.

Inductance components $L_1$ and $L_2$ are respectively generated between the first electrode 21A1 and the first through-hole 21A2 and between the second electrode 21B1 and the second through-hole 21B2. Further, capacitance components $C_1$ and $C_2$ are respectively generated between the first electrode 21A1 and the ground 29 and between the second electrode 21B1 and the ground 29. Furthermore, capacitance components $C_{g1}$ and $C_{g2}$ are respectively generated between the first electrode 21A1 and the antenna pattern 17 and between the second electrode 21B1 and the antenna pattern 17.

Forming the first electrode 21A1 and the second electrode 21B1 on a plurality of layers of the thin first low-loss film 20A and the thin second low-loss film 20B, respectively, as described above allows even thin films to form equivalent circuits (of the EBG structure) in which filters made up of inductance and capacitance are disposed on a periodic basis.

Adjusting, with simulation, filter characteristics made up of such L and C, the shape and size of the electrode, which is the smallest unit of the periodic structure, the number of repetitions, and the thickness of the plurality of films enables broadband impedance matching, and a reflection coefficient F can be set to +1.

In other words, energy on the surface can be controlled in view of the filter equivalent circuits, that is, multiple reflection is suppressed by the multi-stage configuration of the metasurfaces disposed on the human body side with respect to the antenna pattern 17, and thus the energy emitted from the antenna pattern 17 to the human body is reduced. Consequently, the reflection of radio waves from the human body can be reduced. As a result, the influence on the antenna pattern 17 is reduced, allowing the radio waves to be sufficiently emitted in the target direction.

Note that the metasurface may be formed of holes disposed in a two-dimensional square grid (that is, in a matrix) having periodicity in conductive members. Also, the shape of the conductive members or the holes is not limited to particular shapes and can be various if the conductive members or the holes can be periodically disposed.

Figure 6:
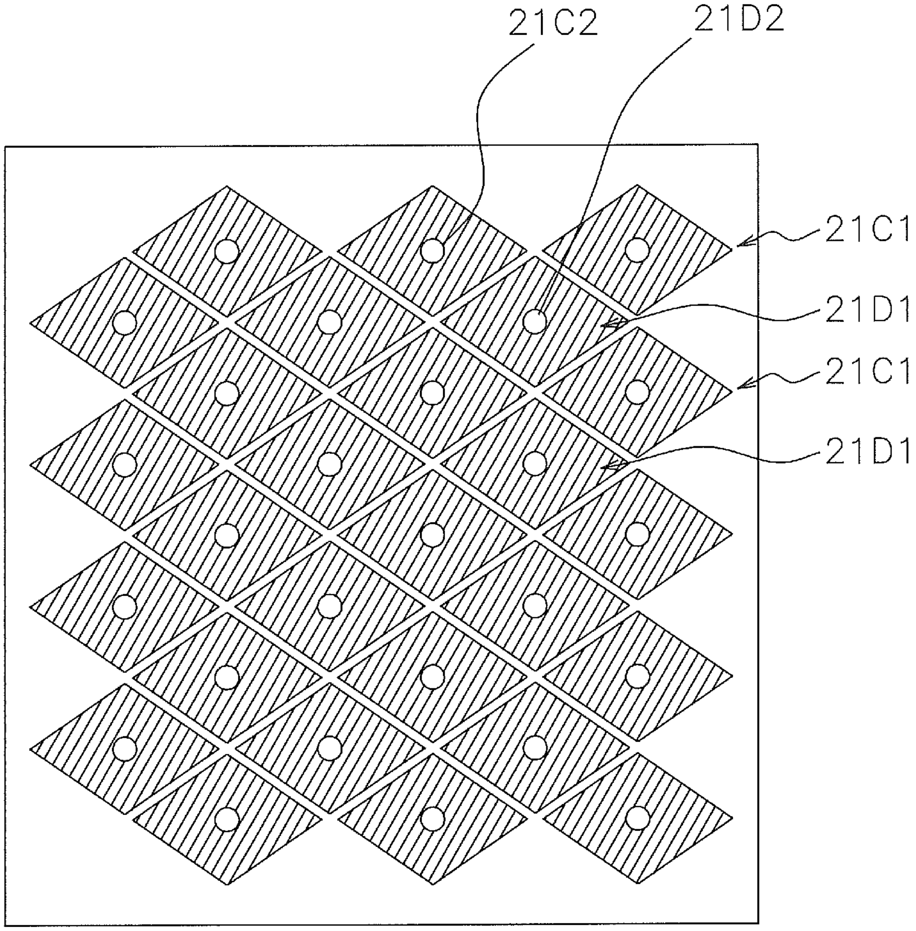
FIG. 6 is a schematic plan view illustrating a plane position of a metasurface according to a modified example.

A modified example of the metasurface in a shape in a planar view will be described with the use of FIG. 6. FIG. 6 is a schematic plan view illustrating a plane position of a metasurface according to the modified example. The basic configuration is the same as that in the embodiment described above.

A third electrode 21C1 and a fourth electrode 21D1 correspond to the first electrode 21A1 and the second electrode 21B1 of the first embodiment and have regular hexagons. The third electrodes 21C1 and the fourth electrodes 21D1 in respective rows are alternately arranged side by side and are not overlapped with each other in a planar view. Note that a third through-hole 21C2 is provided corresponding to the third electrode 21C1 and that a fourth through-hole 21D2 is provided corresponding to the fourth electrode 21D1.

The shape and arrangement position of the electrode is not limited. For example, the electrodes may be partially overlapped with each other.

2. Second Embodiment

In the first embodiment, the number of layers of the low-loss films may be three but may be three or more.

Figure 7:
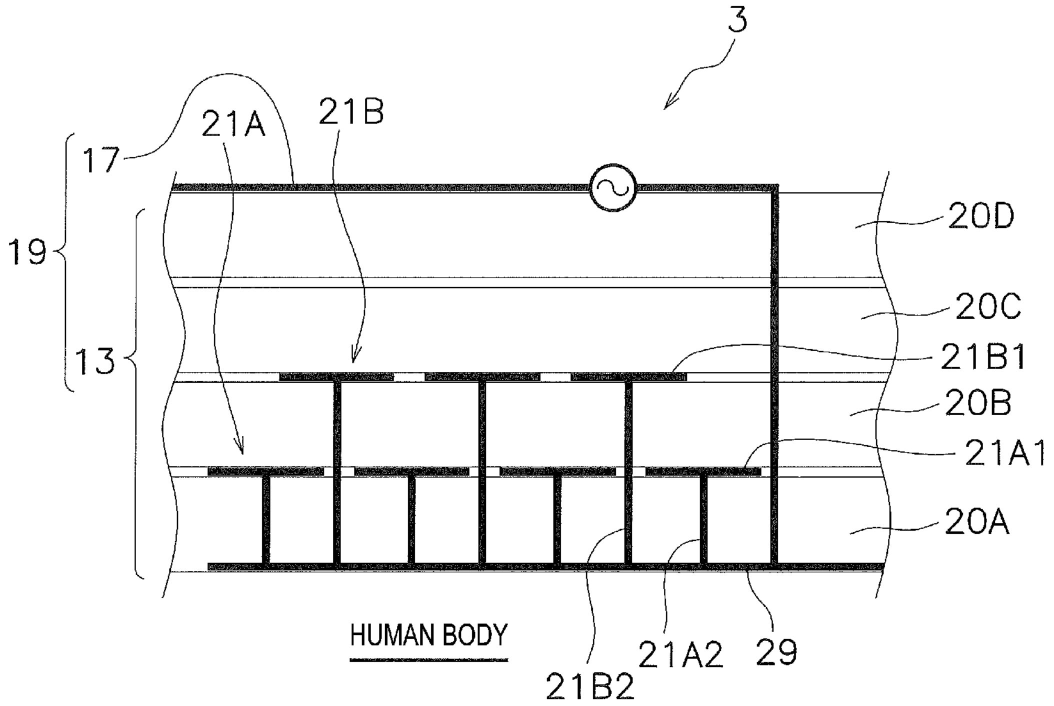
FIG. 7 is a schematic diagram illustrating a cross-sectional configuration of an antenna device according to a second embodiment of the present invention.
Figure 8:
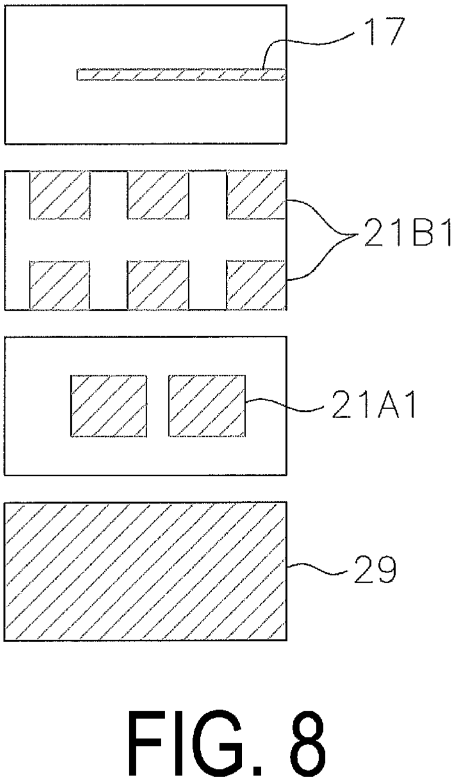
FIG. 8 is a schematic plan view illustrating plane positions of an antenna and a metasurface in each low-loss film.

A second embodiment of the present invention will be described as such an embodiment with the use of FIGS. 7 and 8. FIG. 7 is a schematic diagram illustrating a cross-sectional configuration of an antenna device according to the second embodiment. FIG. 8 is a schematic plan view illustrating plane positions of an antenna and a metasurface in each low-loss film.

The antenna device 3 is, for example, a plate inverted F antenna (PIFA), and includes the metasurface layer 13.

The metasurface layer 13 includes a plurality of low-loss films and metasurfaces (described below). The antenna pattern 17 is formed on the upper surface of the metasurface layer 13 in the drawing. The antenna film 19 is formed of the metasurface layer 13 and the antenna pattern 17 that are described above.

The antenna film 19 includes the first low-loss film 20A, the second low-loss film 20B, the third low-loss film 20C, and a fourth low-loss film 20D from the lower side in the drawing. The films are layered together.

The antenna pattern 17 is formed on an upper surface of the fourth low-loss film 20D.

The first electrode 21A1 of the first metasurface 21A is formed on the upper surface of the first low-loss film 20A. The second electrode 21B1 of the second metasurface 21B is formed on the upper surface of the second low-loss film 20B.

The ground 29 is formed on the lower surface of the first low-loss film 20A.

The first electrodes 21A1 are disposed at intervals from each other, for example, in a grid. The same applies to the second electrode 21B1.

The first metasurface 21A includes the first through-hole 21A2 through which the first electrode 21A1 is connected to the ground 29.

The second metasurface 21B includes the second through-hole 21B2 through which the second electrode 21B1 is connected to the ground 29.

The first through-hole 21A2 corresponds to each one of the first electrodes 21A1 and extends through the second low-loss film 20B and the first low-loss film 20A to connect the first electrode 21A1 to the ground 29.

The same applies to the second through-hole 21B2.

3. Third Embodiment

The number of layers of the low-loss films are three in the first embodiment but may be three or more.

Figure 9:
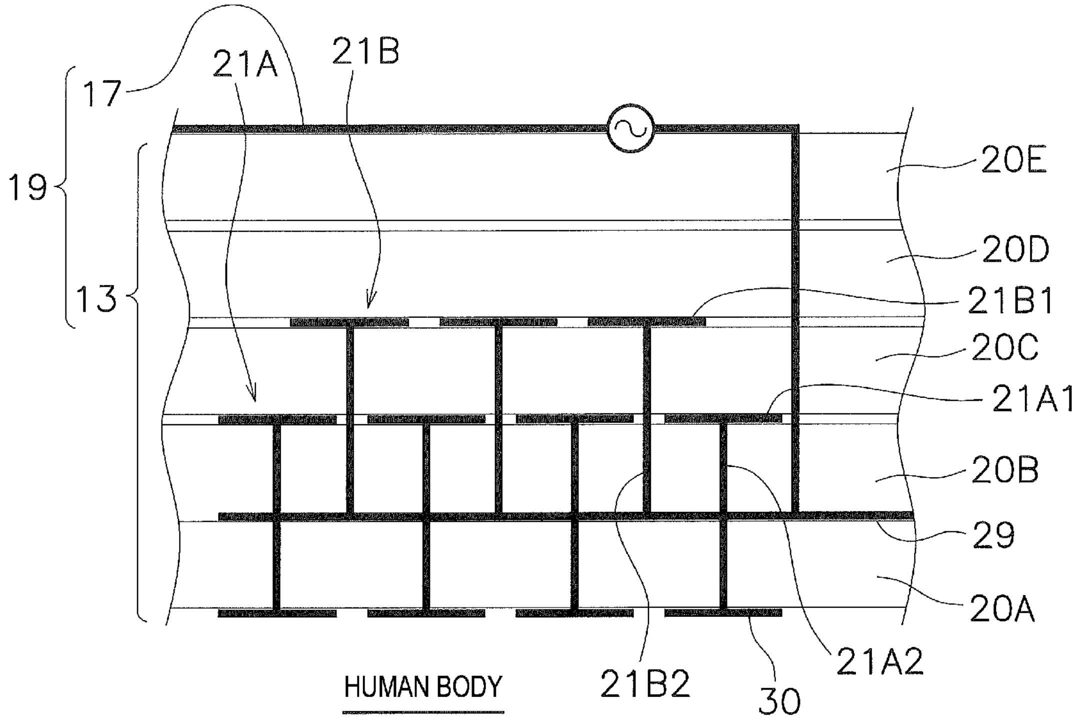
FIG. 9 is a schematic diagram illustrating a cross-sectional configuration of an antenna device according to a third embodiment of the present invention.
Figure 10:
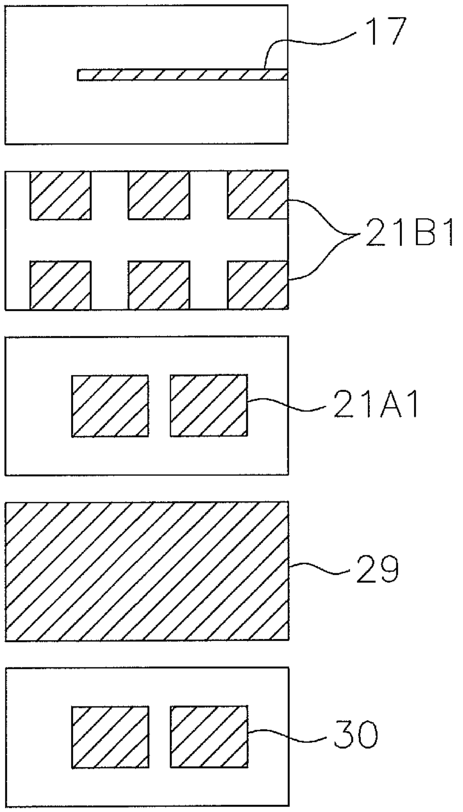
FIG. 10 is a schematic plan view illustrating plane positions of an antenna and a metasurface in each low-loss film.

A third embodiment of the present invention will be described as such an embodiment with the use of FIGS. 9 and 10. FIG. 9 is a schematic diagram illustrating a cross-sectional configuration of an antenna device according to the third embodiment. FIG. 10 is a schematic plan view illustrating plane positions of an antenna and a metasurface in each low-loss film.

In FIG. 9, the lower side in the drawing is the human body side. The antenna device 3 is, for example, a plate inverted F antenna (PIFA), and includes the metasurface layer 13.

The metasurface layer 13 includes a plurality of low-loss films and metasurfaces (described below). The antenna pattern 17 is formed on the upper surface of the metasurface layer 13 in the drawing. The antenna film 19 is formed of the metasurface layer 13 and the antenna pattern 17 that are described above.

In FIG. 9, the antenna film 19 includes the first low-loss film 20A, the second low-loss film 20B, the third low-loss film 20C, the fourth low-loss film 20D, and a fifth low-loss film 20E from the lower side in the drawing. The films are layered together.

The antenna pattern 17 is formed on an upper surface of the fifth low-loss film 20E.

The first electrode 21A1 of the first metasurface 21A is formed on the upper surface of the second low-loss film 20B. The second electrode 21B1 of the second metasurface 21B is formed on the upper surface of the third low-loss film 20C.

The ground 29 is formed on the upper surface of the first low-loss film 20A.

Third electrodes 30 are formed on a lower surface of the first low-loss film 20A.

The first electrodes 21A1 are disposed at intervals from each other, for example, in a grid. The same applies to the second electrode 21B1.

The first metasurface 21A includes the first through-hole 21A2 through which the first electrode 21A1, the ground 29, and the third electrode 30 are connected.

The second metasurface 21B includes the second through-hole 21B2 through which the second electrode 21B1 is connected to the ground 29.

The first through-hole 21A2 corresponds to each one of the first electrodes 21A1 and each one of the third electrodes 30 and extends through the second low-loss film 20B and the first low-loss film 20A.

The same applies to the second through-hole 21B2.

4. Fourth Embodiment

The number of low-loss films on which metasurfaces are formed are two in the first to third embodiments but may be two or more.

Figure 11:
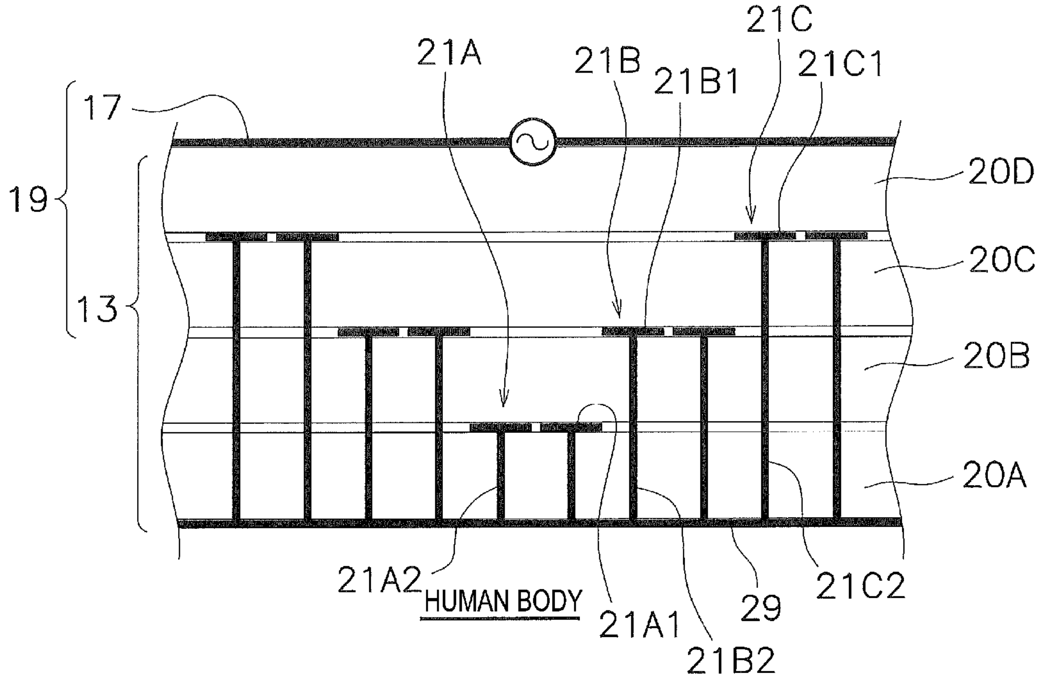
FIG. 11 is a schematic diagram illustrating a cross-sectional configuration of an antenna device according to a fourth embodiment of the present invention.
Figure 12:
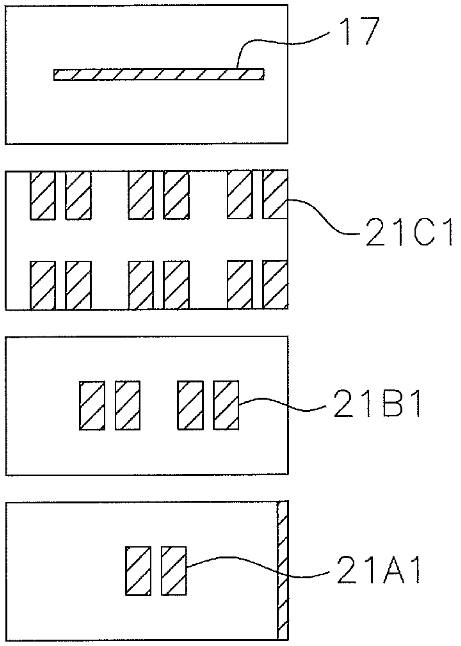
FIG. 12 is a schematic plan view illustrating plane positions of an antenna and a metasurface in each low-loss film.

A fourth embodiment of the present invention will be described as such an embodiment with the use of FIGS. 11 and 12. FIG. 11 is a schematic diagram illustrating a cross-sectional configuration of an antenna device according to the fourth embodiment. FIG. 12 is a schematic plan view illustrating plane positions of an antenna and a metasurface in each low-loss film.

In FIG. 11, the lower side in the drawing is the human body side. The antenna device 3 is, for example, a dipole antenna, and includes the metasurface layer 13.

The metasurface layer 13 includes a plurality of low-loss films and metasurfaces (described below). The antenna pattern 17 is formed on the upper surface of the metasurface layer 13 in the drawing. The antenna film 19 is formed of the metasurface layer 13 and the antenna pattern 17 that are described above.

In FIG. 11, the antenna film 19 includes the first low-loss film 20A, the second low-loss film 20B, the third low-loss film 20C, and the fourth low-loss film 20D from the lower side in the drawing. The films are layered together.

The antenna pattern 17 is formed on the upper surface of the fourth low-loss film 20D.

The first electrode 21A1 of the first metasurface 21A is formed on the upper surface of the first low-loss film 20A. The second electrode 21B1 of the second metasurface 21B is formed on the upper surface of the second low-loss film 20B. The third electrodes 21C1 of the third metasurface 21C are formed on the upper surface of the third low-loss film 20C.

The ground 29 is formed on the lower surface of the first low-loss film 20A.

The first electrodes 21A1 are disposed at intervals from each other in a grid. The same applies to the second electrode 21B1 and the third electrode 21C1.

The first metasurface 21A includes the first through-hole 21A2 through which the first electrode 21A1 is connected to the ground 29.

The second metasurface 21B includes the second through-hole 21B2 through which the second electrode 21B1 is connected to the ground 29.

The third metasurface 21C includes a third through-hole 21C2 through which the third electrode 21C1 is connected to the ground 29.

The first through-hole 21A2 corresponds to each one of the first electrodes 21A1 and extends through the first low-loss film 20A to connect the first electrode 21A1 to the ground 29.

The same applies to the second through-hole 21B2 and the third through-hole 21C2.

5. Fifth Embodiment

In first to fourth embodiments, the electrode of the metasurface is connected via the through-hole to the ground; however, by increasing the area of the electrode or decreasing an interval between the layers, the through-hole for the electrode may be omitted.

Figure 13:
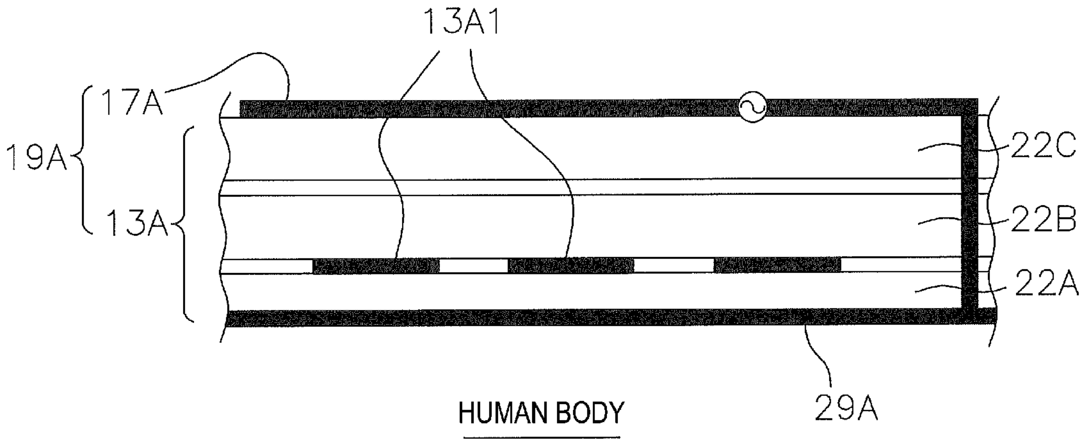
FIG. 13 is a schematic diagram illustrating a cross-sectional configuration of an antenna device according to a fifth embodiment of the present invention.
Figure 14:
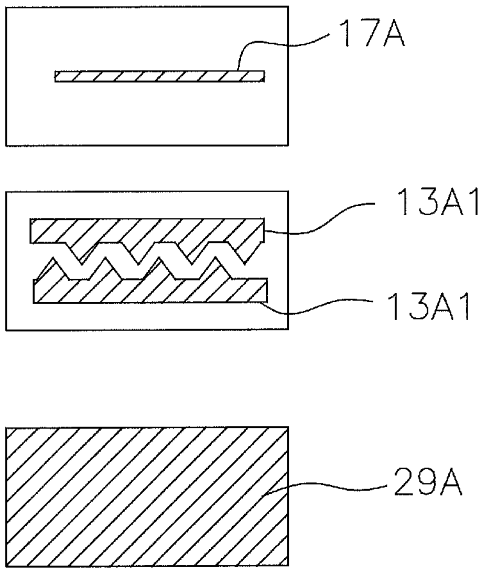
FIG. 14 is a schematic plan view illustrating a plane position of a metasurface.

A fifth embodiment of the present invention will be described as such an embodiment with the use of FIGS. 13 and 14. FIG. 13 is a schematic diagram illustrating a cross-sectional configuration of an antenna device according to the fifth embodiment. FIG. 14 is a schematic plan view illustrating plane positions of an antenna and a metasurface in each low-loss film.

The antenna device 3 is, for example, a plate inverted F antenna (PIFA), and includes a metasurface layer 13A.

The metasurface layer 13A includes a plurality of low-loss films and metasurfaces (described below). An antenna pattern 17A is formed on an upper surface of the metasurface layer 13A in the drawing. An antenna film 19A is formed of the metasurface layer 13A and the antenna pattern 17A that are described above.

The antenna film 19A includes a first low-loss film 22A, a second low-loss film 22B, and a third low-loss film 22C from the lower side in the drawing. The films are layered together.

The antenna pattern 17A is formed on an upper surface of the third low-loss film 22C.

Electrodes 13A1 of the metasurface are formed below the second low-loss film 20B. The electrodes 13A1 include, for example, as illustrated in FIG. 14, a combination of a pair of electrodes extending in one direction while being disposed side by side. More specifically, the pair of electrodes of the electrodes 13A1 include triangular projections extending toward each other and leave a portion where a zigzag-shaped (sawtooth-shaped) electrode is not formed between the pair of electrodes.

A ground 29A is formed on a lower surface of the first low-loss film 22A. As described above, only the first low-loss film 22A is disposed between the electrodes 13A1 of the metasurface and the ground 29A.

In this embodiment, no through-hole that connects the electrode to the ground is formed. However, for example, the antenna performance is maintained by one or a plurality of features such as the wide shape of the electrode, the short distance between the electrode and the ground, and the like.

6. Sixth Embodiment

Other embodiments in which the metasurface without through-holes will be described.

Figure 15:
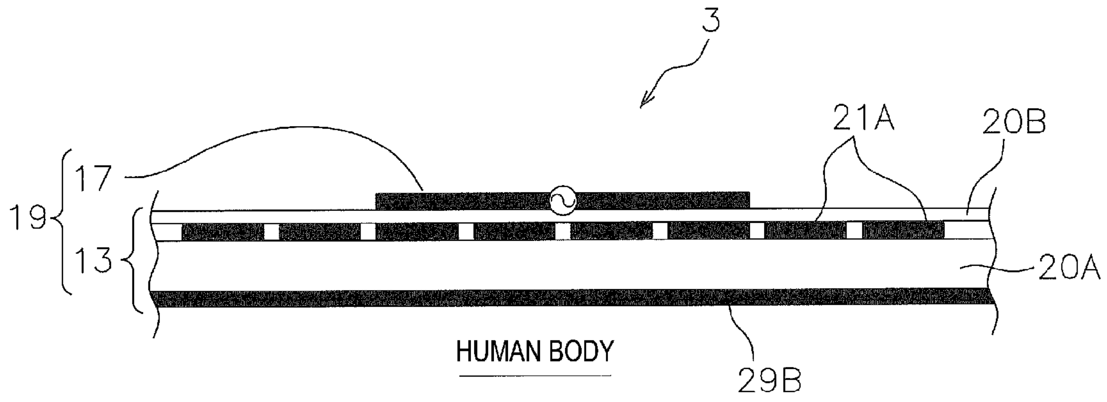
FIG. 15 is a schematic diagram illustrating a cross-sectional configuration of an antenna device according to a sixth embodiment of the present invention.
Figure 16:
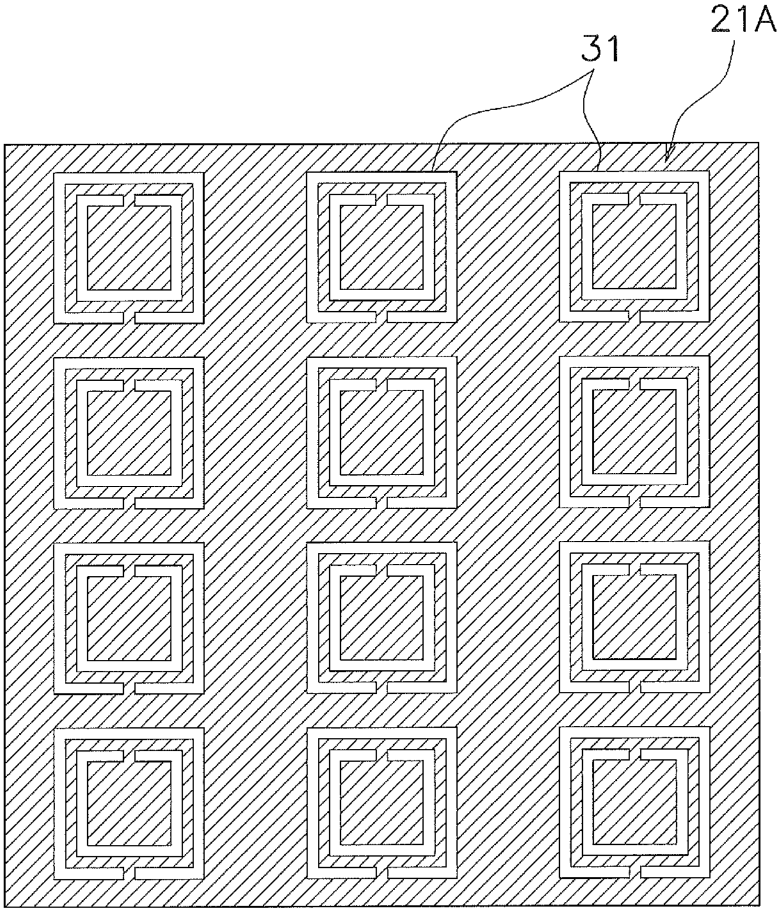
FIG. 16 is a schematic plan view illustrating a plane position of a metasurface.
Figure 17:
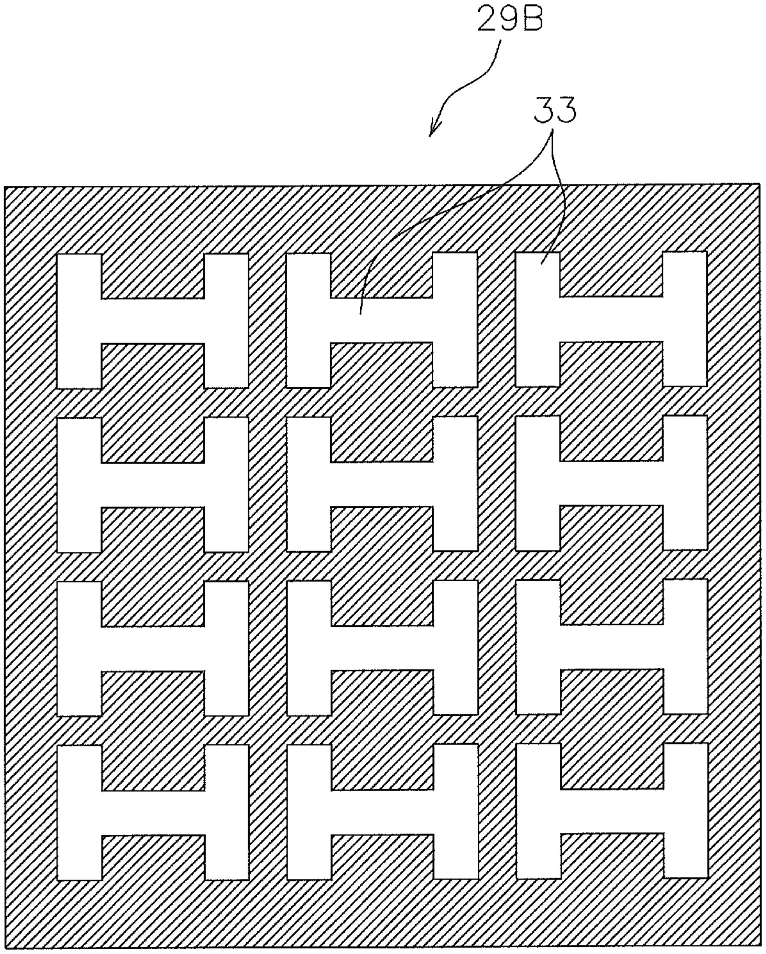
FIG. 17 is a schematic diagram illustrating a planar configuration of a ground.

A sixth embodiment of the present invention will be described as such an embodiment with the use of FIGS. 15 to 17. FIG. 15 is a schematic diagram illustrating a cross-sectional configuration of an antenna device according to the sixth embodiment. FIG. 16 is a schematic plan view illustrating a plane position of a metasurface. FIG. 17 is a schematic plan view illustrating a planar configuration of a ground.

In FIG. 15, the lower side in the drawing is the human body side. The antenna device 3 includes the metasurface layer 13.

The metasurface layer 13 includes a plurality of low-loss films and metasurfaces (described below). The antenna pattern 17 is formed on the upper surface of the metasurface layer 13 in the drawing. The antenna film 19 is formed of the metasurface layer 13 and the antenna pattern 17 that are described above.

In FIG. 15, the antenna film 19 includes the first low-loss film 20A, the second low-loss film 20B from the lower side in the drawing. The films are layered together.

The antenna pattern 17 is formed on the upper surface of the second low-loss film 20B.

The first metasurface 21A is formed on the upper surface of the first low-loss film 20A. As illustrated in FIG. 16, the first metasurface 21A is a complementary split ring resonator (CSRR) and includes cutouts 31 having a split ring shape.

A ground 29B is formed on the lower side of the first low-loss film 20A.

As illustrated in FIG. 17, the ground 29B is a defect ground structure (DGS) in which cutouts 33 corresponding to the first metasurface 21A are formed. The cutouts 33 are each formed in an H-shape.

As described above, the antenna film 19 without through-holes is implemented.

As described above, the metasurface, which is one layer, can further achieve a multi-stage equivalent circuit as in the first embodiment.

7. Seventh Embodiment

Figure 18:
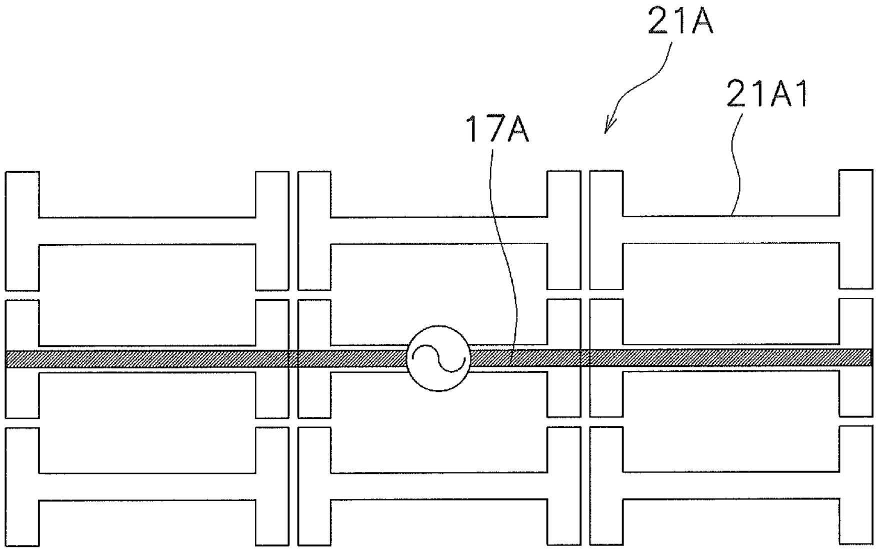
FIG. 18 is a schematic plan view illustrating plane positions of an antenna and a metasurface in each low-loss film according to a seventh embodiment of the present invention.
Figure 19:
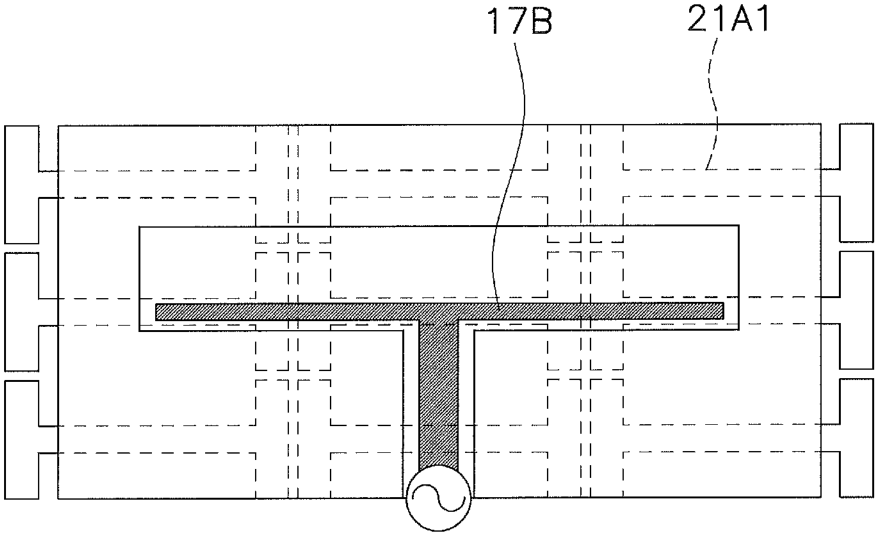
FIG. 19 is a schematic plan view of a metasurface according to a modified example.

A seventh embodiment of the present invention will be described with the use of FIGS. 18 and 19. FIG. 18 is a schematic plan view illustrating plane positions of an antenna and a metasurface in each low-loss film according to the seventh embodiment. FIG. 19 is a schematic plan view of a metasurface according to a modified example.

The layer configuration of the seventh embodiment is the same as that of the fifth embodiment. In other words, the metasurface is one layer.

The antenna pattern 17A has a linear shape extending in one direction. The power supply of the antenna pattern 17A is performed at the intermediate position in whole.

The first electrode 21A1 of the first metasurface 21A has an H-shape in a planar view.

As described above, an artificial magnetic conductor (AMC) is implemented. Therefore, emission efficiency and impedance matching can be maintained through the reflection coefficient Γ=+1 characteristics. As a result, the impact on the human body can be minimized.

In the modified example illustrated in FIG. 19, an antenna pattern 17B is a co-planar wave-line (CPW) path structure, and the power supply to the antenna is performed at a lower end of the CPW.

8. Eighth Embodiment

Figure 20:
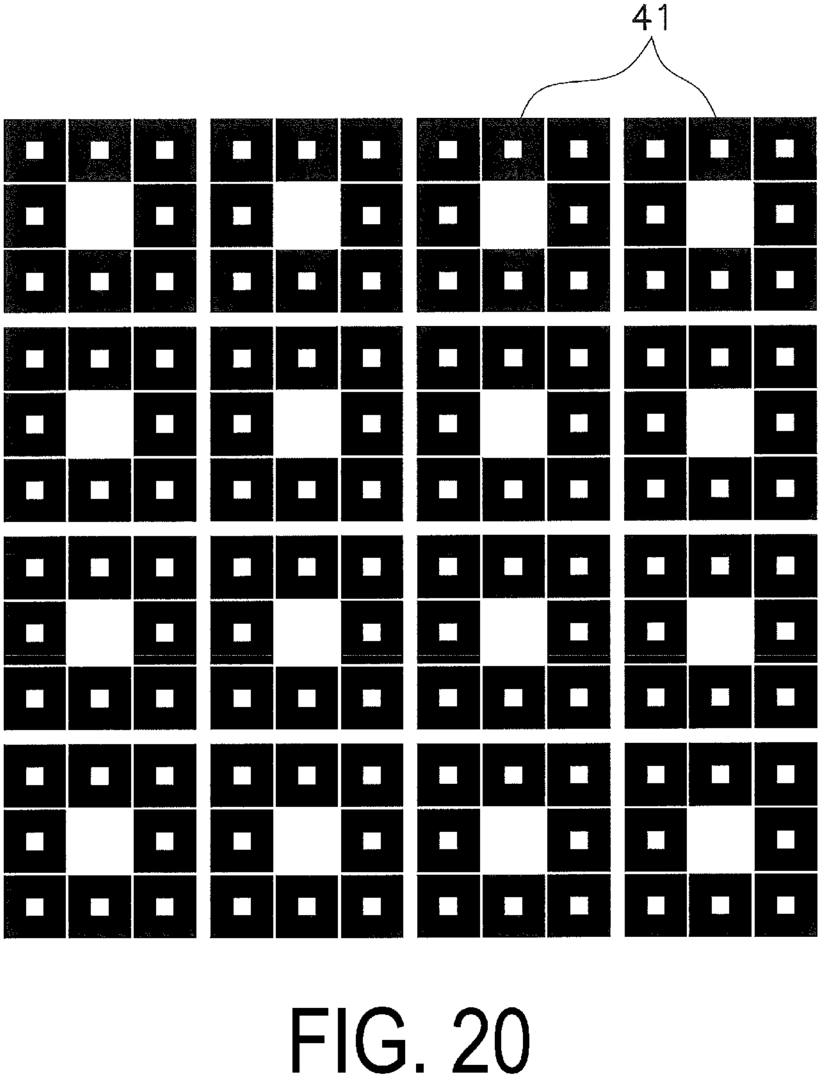
FIG. 20 is a schematic plan view of a metasurface according to an eighth embodiment of the present invention.

An eighth embodiment of the present invention will be described with the use of FIG. 20. FIG. 20 is a schematic plan view of a metasurface according to the eighth embodiment.

In this embodiment, electrodes 41 of a metasurface 21 have a fractal shape. The fractal refers to one in which a diagram portion and the entire portion are self-similar (recursion).

Specifically, the electrodes 41 of the metasurface 21 each have the shape formed of a large number of self-similar rectangles. Note that the minimum unit of the electrode 41 is a rectangular conductive member, and the conductive member includes a rectangular portion in the center in which a conductive member is not formed.

Since the electrodes of the metasurface adopt the fractal shape as described above, it can be easy to provide broadband and miniaturization. In particular, broadband characteristics can be obtained as the fractal order increases.

In the related art, it has been considered to omit through-holes from the metasurface due to manufacturing problems. In that case, unfortunately, the metasurface area and the entire area increase to have the same performance. The electrode of the metasurface having a fractal shape as in the present embodiment allows various equivalent circuits to be created, allowing the entire size to be reduced while maintaining performance. This allows through-holes to be omitted.

In this embodiment, the metasurface includes one layer but may include multiple layers. In the case of the multiple layers, through-holes may be provided or may be omitted.

9. Ninth Embodiment

Figure 21:
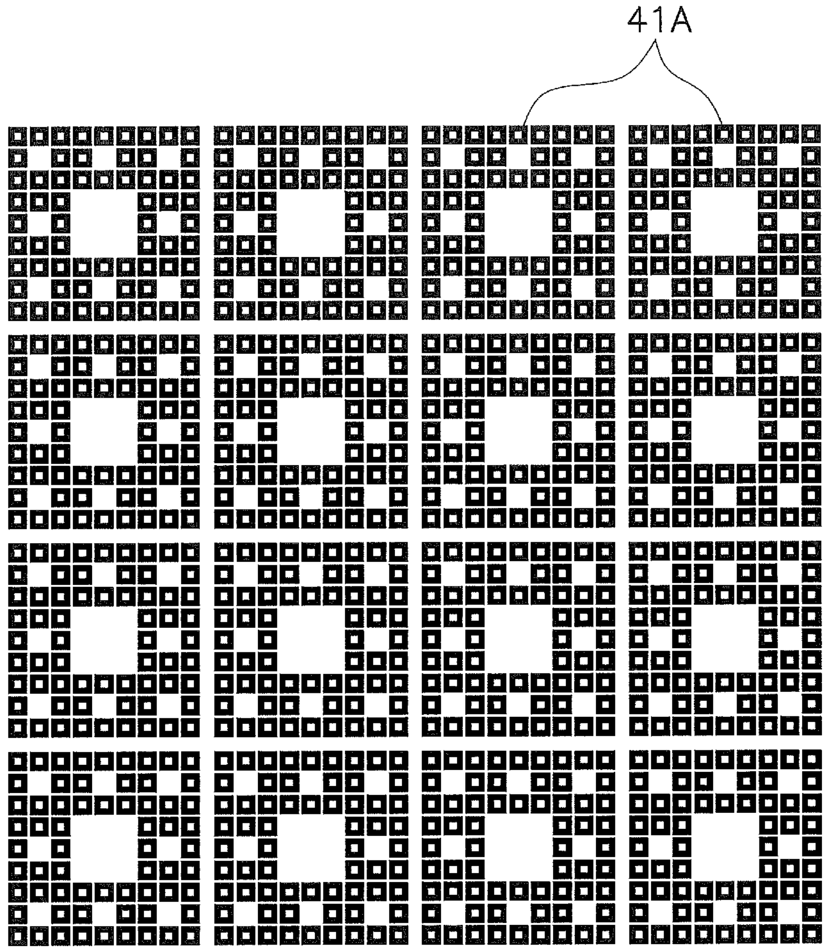
FIG. 21 is a schematic plan view of a metasurface according to a ninth embodiment of the present invention.

A ninth embodiment of the present invention will be described with the use of FIG. 21. FIG. 21 is a schematic plan view illustrating a metasurface according to the ninth embodiment.

In this embodiment, electrodes 41A of the metasurface 21 have a fractal shape. Specifically, the electrodes 41A of the metasurface 21 each have the shape formed of a large number of self-similar rectangles. The electrode 41A is an example in which the fractal order is greater than that of the electrode 41.

10. Tenth Embodiment

Figure 22:
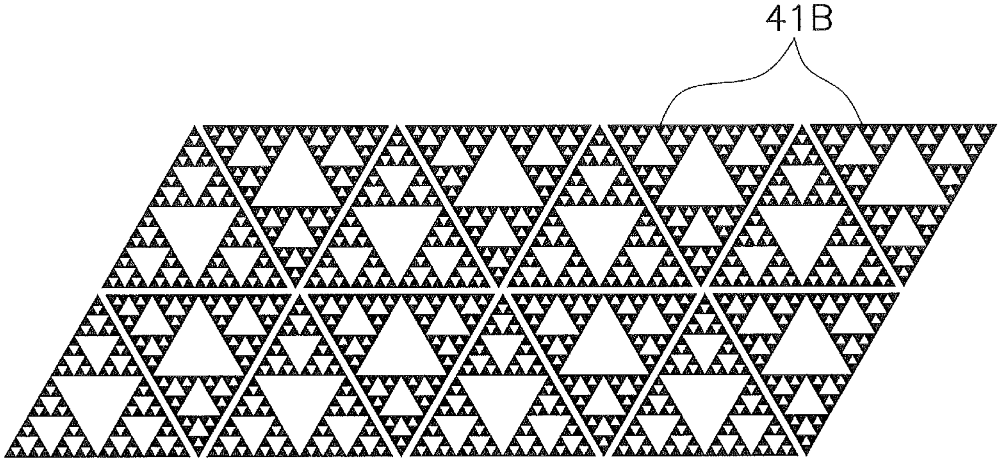
FIG. 22 is a schematic plan view of a metasurface according to a tenth embodiment of the present invention.

A tenth embodiment of the present invention will be described with the use of FIG. 22. FIG. 22 is a schematic plan view of a metasurface according to the tenth embodiment.

In this embodiment, electrodes 41B of the metasurface 21 have a fractal shape. Specifically, the electrodes 41B are each a graphic formed of an infinite number of self-similar triangles. Note that the minimum unit of the electrode 41B is a triangular conductive member, and a reversed triangular portion in which a conductive member is not formed is present between the three conductive members oriented in the same direction.

11. Eleventh Embodiment

Figure 23:
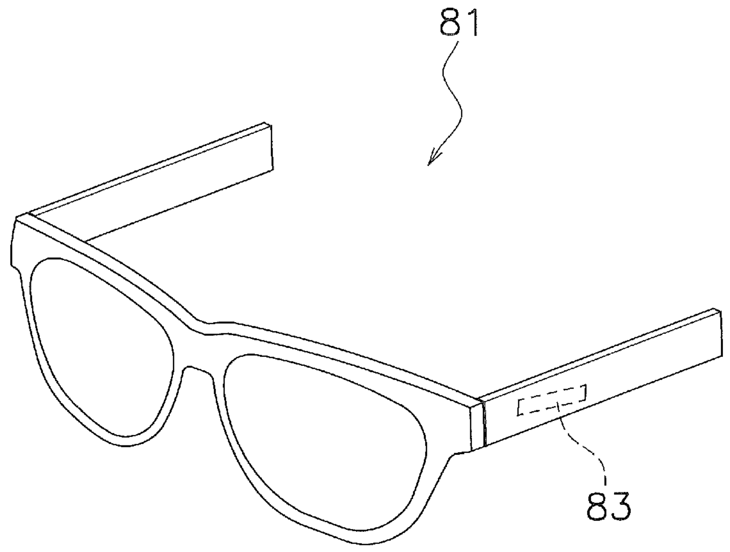
FIG. 23 is a schematic perspective view of smart glasses in which an antenna device according to an eleventh embodiment of the present invention is incorporated.
Figure 24:
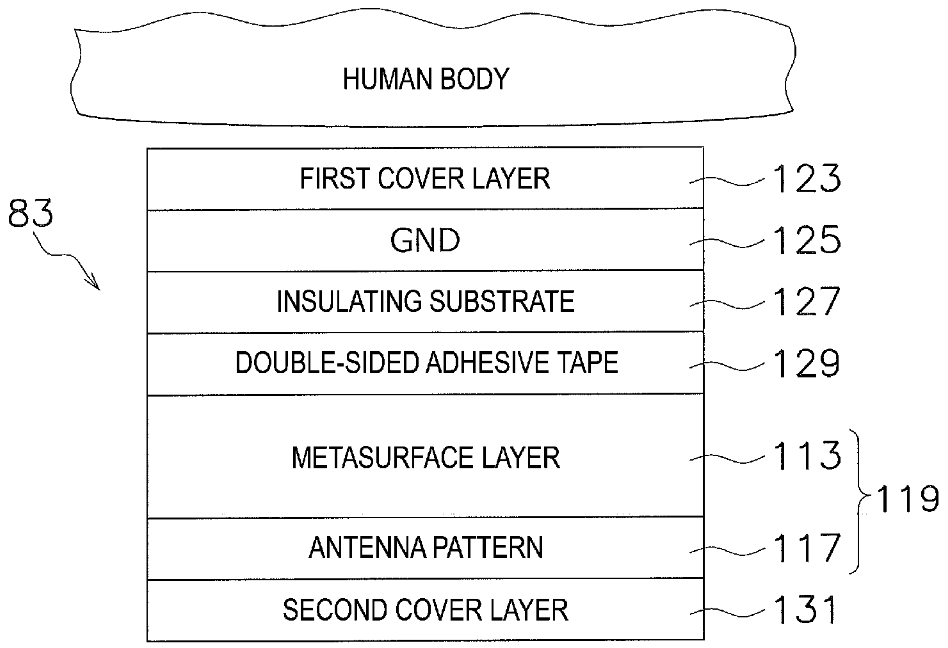
FIG. 24 is a schematic diagram illustrating a layer configuration of the antenna device.

An eleventh embodiment of the present invention will be described with the use of FIGS. 23 and 24. FIG. 23 is a schematic perspective view of smart glasses in which an antenna device according to the eleventh embodiment is incorporated. FIG. 24 is a schematic diagram illustrating a layer configuration of the antenna device.

As illustrated in FIG. 23, smart glasses 81 internally include an antenna device 83.

In FIG. 24, the lower side in the drawing is the human body side. The antenna device 83 is, for example, Bluetooth (trade name), and includes a first cover layer 123, a GND 125, an insulating substrate 127, double-sided adhesive tape 129, a metasurface layer 113 (an example of the metasurface layer), and a second cover layer 131 from the upper side toward the lower side in the drawing.

The metasurface layer 113 includes one or a plurality of low-loss films and metasurfaces (described below). An antenna pattern 117 is formed on a lower surface of the metasurface layer 113 in the drawing. The metasurface layer 113 is disposed on the human body side with respect to the antenna pattern 117. An antenna film 119 is formed of the metasurface layer 113 and the antenna pattern 117 that are described above.

The configuration of the metasurface layer 113 is the same as those of the metasurface layers according to the first to tenth embodiments.

12. Twelfth Embodiment

Figure 25:
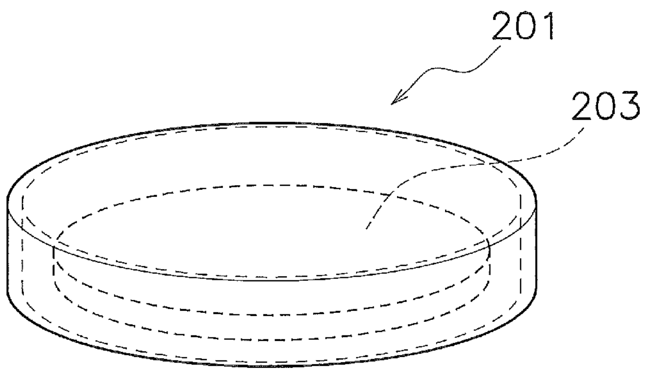
FIG. 25 is a drawing illustrating a use state of a continuous glucose monitoring in which an antenna device according to a twelfth embodiment of the present invention is incorporated. A schematic perspective view of the continuous glucose monitoring.
Figure 26:
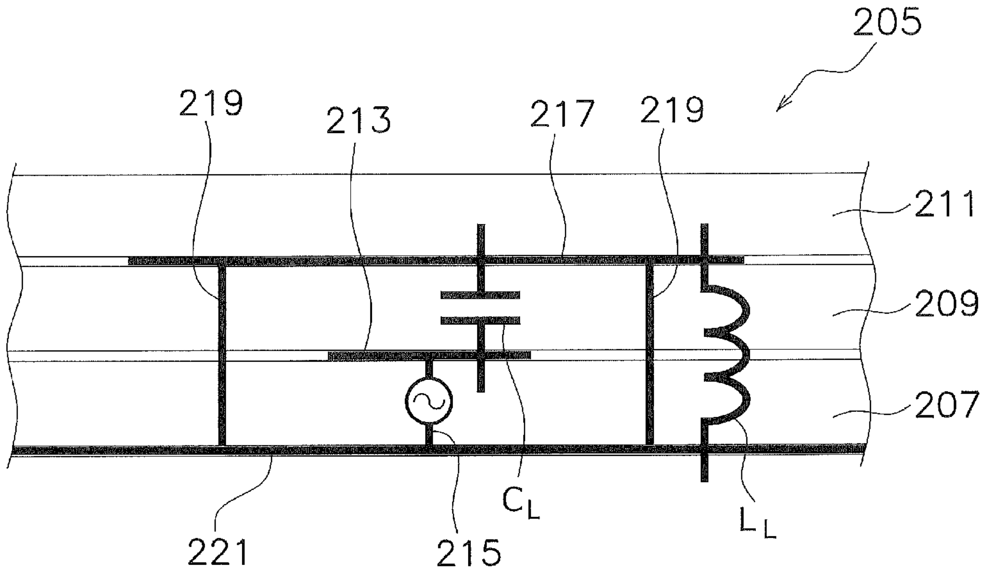
FIG. 26 is a schematic diagram illustrating a cross-sectional configuration of the antenna device.
Figure 27:
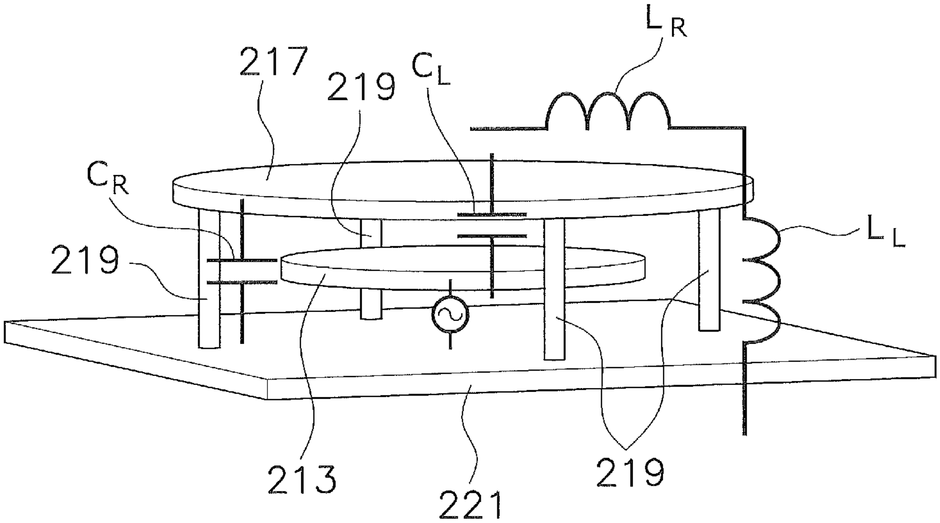
FIG. 27 is a schematic perspective view of the antenna device.
Figure 28:
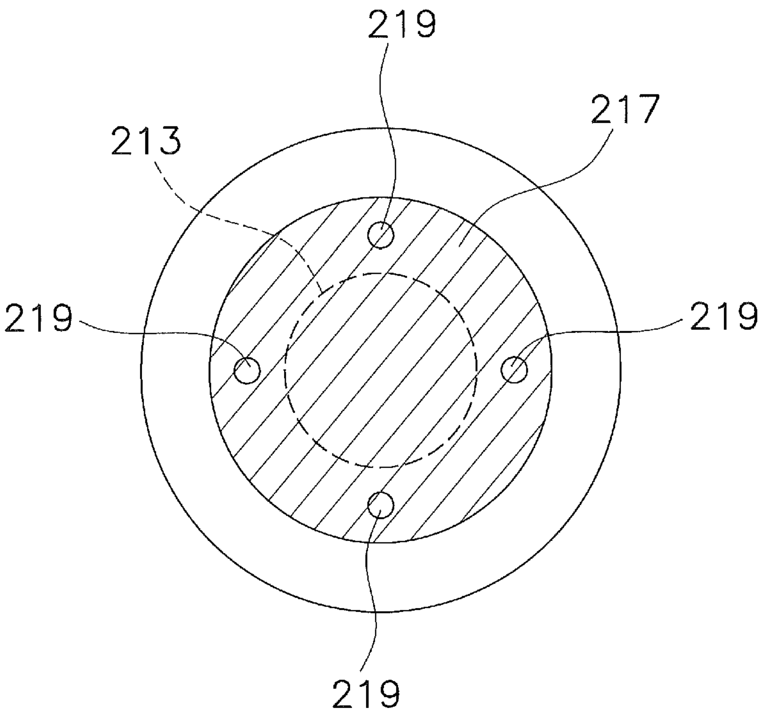
FIG. 28 is a schematic plan view of the antenna device.
Figure 29:
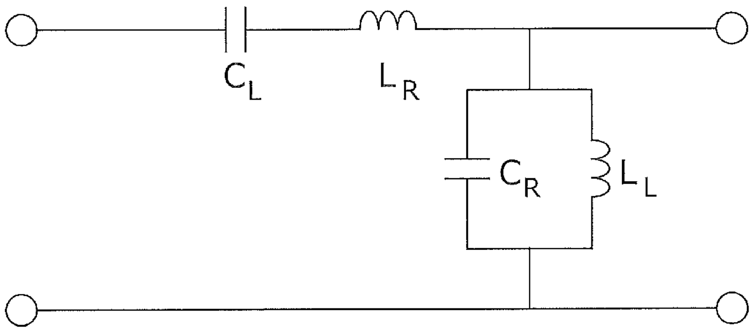
FIG. 29 is an equivalent circuit diagram of the antenna device.

A twelfth embodiment of the present invention will be described with the use of FIGS. 25 to 29. FIG. 25 is a schematic perspective view of a continuous glucose monitoring in which an antenna device according to the twelfth embodiment is incorporated. FIG. 26 is a schematic diagram illustrating a cross-sectional configuration of the antenna device. FIG. 27 is a schematic perspective view of the antenna device. FIG. 28 is a schematic plan view of the antenna device. FIG. 29 is an equivalent circuit diagram of the antenna device.

A continuous glucose monitoring (GMC) 201 is mounted on a person's arm, and a measurement result is displayed, for example, on a display device (not illustrated).

As illustrated in FIG. 25, the GMC 201 includes an antenna device 203. The antenna device 203 is, for example, a dipole antenna, and includes an antenna film 205 as illustrated in FIG. 26. The antenna film 205 includes a first low-loss film 207, a second low-loss film 209, and a third low-loss film 211 from the lower side toward the upper side in the drawing. The films are layered together.

The antenna film 205 includes a ground 221 formed on a lower surface of the first low-loss film 207.

The antenna film 205 includes a first conductor pattern 213 formed on an upper surface of the first low-loss film 207. The first conductor pattern 213 is a circular shape in a planar view. A first through-hole 215 extends from the first conductor pattern 213 to the ground 221. The first through-hole 215 configures an antenna feed.

The antenna film 205 includes a second conductor pattern 217 formed on an upper surface of the second low-loss film 209. The second conductor pattern 217 is a circular shape in a planar view. The second conductor pattern 217 is larger in area than the first conductor pattern 213 and covers the first conductor pattern 213 in a planar view.

A plurality of second through-holes 219 extends from the second conductor pattern 217 to the ground 221. The second through-holes 219 are disposed around the first conductor pattern 213.

A capacitance component $C_L$ is generated between the first conductor pattern 213 and the second conductor pattern 217. A capacitance component $C_R$ is generated between the second conductor pattern 217 and the ground 221. An inductance component $L_R$ is generated in the second conductor pattern 217. An inductance component $L_L$ is generated in the second through-holes 219.

As illustrated in FIGS. 27 and 28, this embodiment provides four of the second through-holes 219 disposed at equal intervals in a circumferential direction, that is, with periodicity.

As illustrated in FIG. 29, the configuration described above forms an equivalent circuit that achieves composite right-/left-handed transmission line (CRLH) characteristics.

With the configuration described above, zero order resonance (ZOR) characteristics causes an electric current to be carried to the second through-holes 219 both in the human body and the surrounding environment and a large amount of the electric current of the dipole antenna to be totally carried. As a result, the antenna film 205 functions as a broadband antenna.

The number of second through-holes is not limited.

13. Other Embodiments

Although the plurality of embodiments of the present invention has been described as above, the present invention is not limited to the above-described embodiments, and various modified examples are possible without departing from the gist of the invention. In particular, the plurality of embodiments and modified examples described herein can be combined randomly with one another as necessary.

INDUSTRIAL APPLICABILITY

The present invention is widely applicable to an antenna device used at or near a human body or other conductor.

REFERENCE SIGNS LIST

1: Wireless earbud
3: Antenna device
9: Cover layer
11: Adhesive layer
13: Metasurface layer
19: Antenna film
20A: First low-loss film
20B: Second low-loss film
21A: First metasurface
21A1: First electrode
21A2: First through-hole
21B: Second metasurface
21B1: Second electrode
21B2: Second through-hole

The invention claimed is:

1. An antenna device configured to be used in contact with or close to a human body or a conductor, the antenna device comprising:

an antenna; and a metasurface layer that is layered on the antenna, disposed on a human body side, and includes a plurality of low-loss films and a plurality of metasurfaces formed on the plurality of low-loss films, wherein the plurality of low-loss films includes a first-layer low-loss film and a second-layer low-loss film that are layered, the plurality of metasurfaces includes a first-layer metasurface made of a plurality of first-layer electrodes formed on the first-layer low-loss film and a second-layer metasurface made of a plurality of second-layer electrodes formed on the second-layer low-loss film, the plurality of first-layer electrodes is disposed to not at least partially overlap the plurality of second-layer electrodes in a planar view, and the plurality of second-layer electrodes is disposed to not at least partially overlap the plurality of first-layer electrodes in the planar view.

2. The antenna device according to claim 1, wherein the plurality of low-loss films has a thickness of 150 μm or less.

3. The antenna device according to claim 1, wherein the plurality of metasurfaces has a fractal shape.

4. The antenna device according to claim 1, wherein the each of the plurality of second-layer electrodes has a shape identical to a shape of each of the plurality of first-layer electrodes.

5. The antenna device according to claim 1, wherein the plurality of metasurfaces are formed of a visible light transparent conductive film.

6. The antenna device according to claim 1, wherein a first plurality of capacitance components are located between the plurality of first-layer electrodes and a ground.

7. The antenna device according to claim 6, wherein a second plurality of capacitance components are located between the plurality of second-layer electrodes and the ground.

8. The antenna device according to claim 1, wherein the first metasurface includes a first though-hole for each of the plurality of first-layer electrodes.

9. The antenna device according to claim 8, wherein a first inductance component is formed using the first through-hole for each of the plurality of first-layer electrodes.

10. The antenna device according to claim 8, wherein the second metasurface includes a second through-hole for each of the plurality of second-layer electrodes.

11. The antenna device according to claim 10, wherein a second inductance component is formed using the second through-hole for each of the plurality of second-layer electrodes.

12. An antenna device configured to be used in contact with or close to a human body or a conductor, the antenna device comprising:

an antenna; and a metasurface layer that is layered on the antenna, disposed on a human body side, and includes a plurality of low-loss films and a plurality of metasurfaces formed on the plurality of low-loss films, wherein the plurality of low-loss films includes a first-layer low-loss film and a second-layer low-loss film that are layered, the plurality of metasurfaces includes a first-layer metasurface made of a plurality of first-layer electrodes formed on the first-layer low-loss film and a second-layer metasurface made of a plurality of second-layer electrodes formed on the second-layer low-loss film, the plurality of first-layer electrodes is disposed to at least partially overlap the plurality of second-layer electrodes in a planar view, and the plurality of second-layer electrodes is disposed to at least partially overlap the plurality of first-layer electrodes in the planar view.

13. The antenna device according to claim 12, wherein the first-layer low-loss film or the second-layer low-loss film has a thickness of 150 μm or less.

14. The antenna device according to claim 12, wherein the plurality of metasurfaces has a fractal shape.

15. The antenna device according to claim 12, wherein the plurality of metasurfaces are formed of a visible light transparent conductive film.

16. The antenna device according to claim 12, wherein each of the plurality of second-layer electrodes has a shape identical to a shape of each of the plurality of first-layer electrodes.

17. An antenna device comprising:

an antenna; and an antenna film layered on the antenna, wherein the antenna film includes a first low-loss film, a second low-loss film layered with the first low-loss film, and a ground, wherein a first conductor pattern is formed on an upper surface of the first low-loss film, wherein a first through-hole extends from the first conductor pattern to the ground and configures an antenna feed, wherein a second conductor pattern is formed on an upper surface of the second low-loss film, and wherein the second conductor pattern is larger in area than the first conductor pattern.

18. The antenna device of claim 17, wherein a plurality of second through-holes extends from the second conductor pattern to the ground.

19. The antenna device of claim 18, wherein the plurality of second through-holes are disposed around the first conductor pattern.

20. A continuous monitoring glucose device incorporating the antenna device of claim 18.

* * * * *